Figure 1:
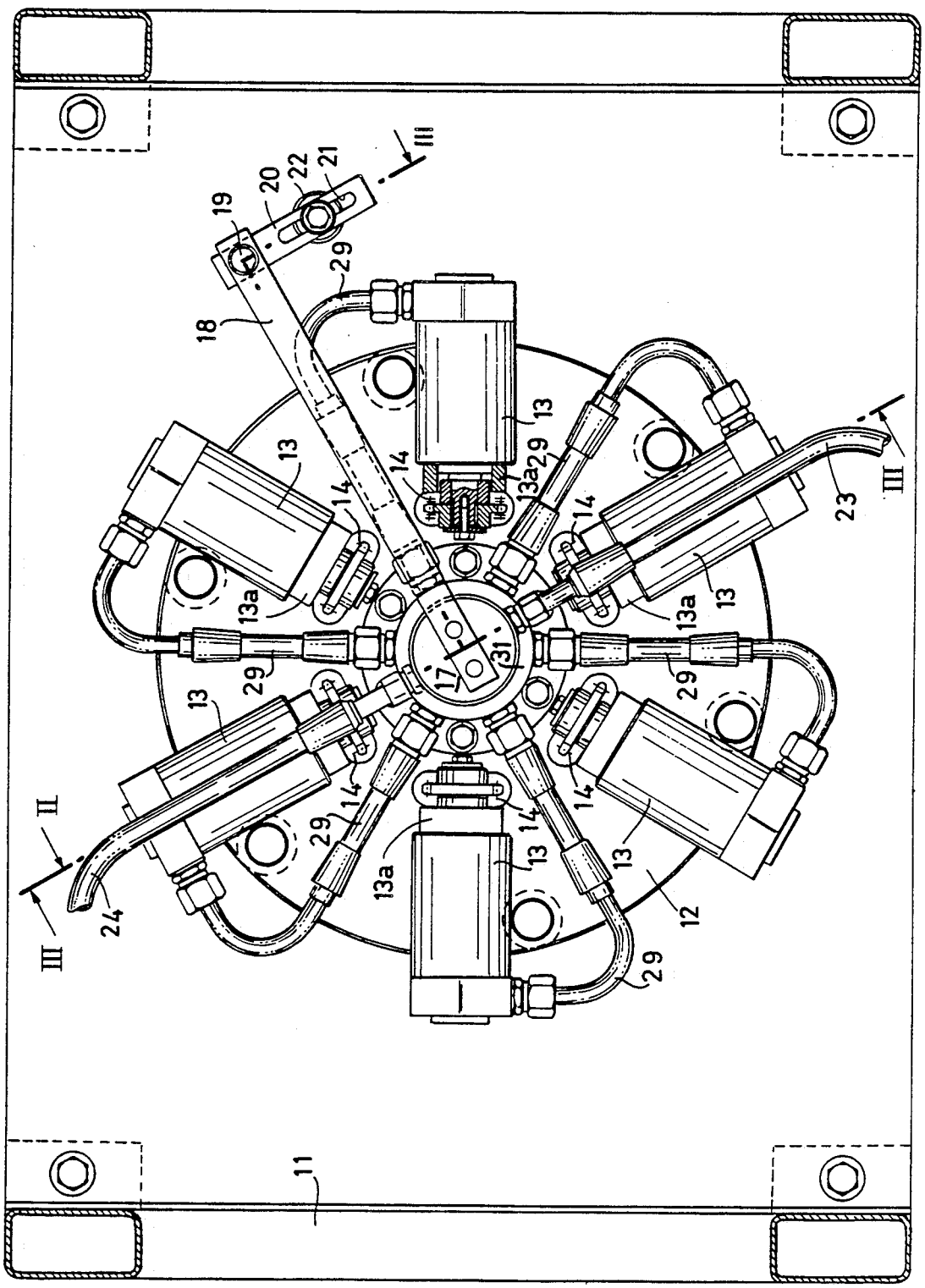

United States Patent [19]

Cucchi

[11] Patent Number: 4,996,897
[45] Date of Patent: Mar. 5, 1991

[54] METAL BAR FEED CONTROL DEVICE WITH DISTRIBUTOR AND SEVERAL HYDRAULIC MOTORS FOR FEEDING A MULTISPINDLE AUTOMATIC LATHE

[75] Inventor: Pietro Cucchi, Bussero, Italy
[73] Assignee: Pietro Cucchi & C. S.r.l., Italy
[21] Appl. No.: 335,863
[22] Filed: Apr. 10, 1989
[30] Foreign Application Priority Data Apr. 20, 1988 [IT] Italy .............................. 20258 A/88

[51] Int. Cl.$^5$ ............................................. B23B 13/00
[52] U.S. Cl. ........................................ 82/124; 82/127; 82/129
[58] Field of Search ................. 82/126, 127, 125, 124, 82/129; 414/14, 17, 18

[56] References Cited

U.S. PATENT DOCUMENTS

| 4,557,166 | 12/1985 | Jauch | 82/129 |
| 4,667,789 | 5/1987 | Cucchi et al. | 82/129 |

Primary Examiner—Frederick R. Schmidt
Assistant Examiner—Lawrence Cruz
Attorney, Agent, or Firm—Shlesinger, Fitzsimmons & Shlesinger

[57] ABSTRACT

A control device for feeding metal bars to a multispindle automatic lathe comprises a rotating drum which bears a plurality of bar pushers arranged peripherally and equidistantly from each other, control means being associated with said bar pushers. In accordance with the invention said control means consist of a hydraulic motor for each bar pusher, said motor being fixed to said rotating drum. Fluid under pressure is fed selectively to at least one or more of said hydraulic motors, depending on the feed requirements, through a unit which comprises a distributor designed to place in communication fluid delivered under pressure with said at least one or more motors during rotation of the drum to which it is constrained.

4 Claims, 5 Drawing Sheets

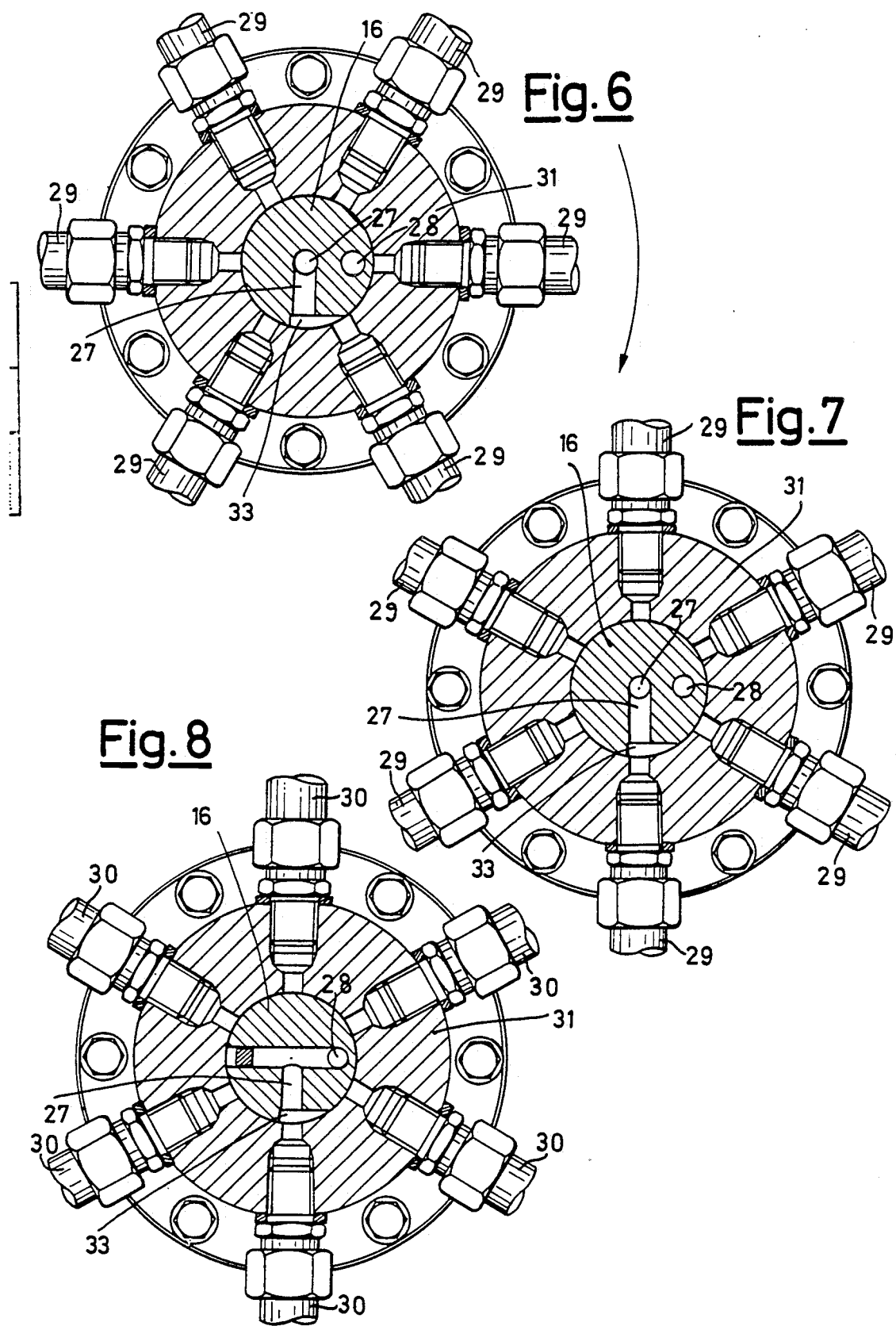

METAL BAR FEED CONTROL DEVICE WITH DISTRIBUTOR AND SEVERAL HYDRAULIC MOTORS FOR FEEDING A MULTISPINDLE AUTOMATIC LATHE

DESCRIPTION

The present invention relates to improvements in a device designed for feeding metal bars to a multispindle automatic lathe.

A device for feeding metal bars to a multispindle automatic lathe, commonly called bar loader, is for example described in detail in European patent No. 174034.

As is known to those skilled in the art, devices of this type have the purpose of feeding the metal bars through a suitable guide apparatus in such a manner as to feed said bars in the proper sequence to the respective spindles of the machine tool.

It is known that in the abovementioned lathes the various spindles are borne by an essentially circular table or rotating drum around the circumference of which the spindles are arranged at equal angular distances.

Thanks to the rotation of the drum the spindles are brought in succession into the various work stations so that the portion of the bar protruding therefrom can be machined to form the workpiece it is desired to produce.

These lathes are fed through a suitable guide apparatus arranged behind the lathe and consisting basically of a plurality of tubular guides also arranged around the circumference on the same longitudinal axis as the lathe spindles and borne by a frame rotating synchronously with the drum which supports the spindles.

The device which is the object of the present invention is designed to achieve in a new, original and advantageous manner control of the feeding of the metal bars through the aforesaid guide apparatus to the lathe spindles.

As a nonlimiting example the guide apparatus may be of the type fully described and illustrated in Italian patent No. 1171688.

A known control device for feeding bars to a multispindle lathe is fully described and illustrated for example in Italian patents Nos. 1161147 and 1175957.

In these devices, as in the one which is the object of the present invention, bar feeding is controlled in steps and meets the specific requirements of the machine tool to which the guide apparatus is connected.

In comparison therewith the control device described for example in the abovementioned Italian patent No. 1161147 meets the requirement of operating only when the machine tool spindle has reached the machining station, i.e. when it has completed a traverse from one station to the next.

At present the search for technological innovations has oriented lathe manufacturers toward the construction of modern machine tools of the numerical control type the operating speed of which has reached considerable levels.

One of the improvements made is to eliminate the dead time of the traverse of the lathe spindle from one station to the next.

As a consequence of the need to satisfy said requirement the general object of the present invention is to overcome the shortcomings of the known art by creating a device for controlling bar feed capable of intervening during rotation of the drum also.

In view of said object in accordance with the present invention it was thought to realize a control device for feeding metal bars to a multispindle automatic lathe of the type comprising a rotating drum bearing a plurality of bar pushers arranged around the periphery at equal distances from each other, there being associated with said bar pusher control means characterized in that said control means consist of a hydraulic motor for each bar pusher, said motor being fixed to said rotating drum, fluid under pressure being fed selectively to at least one of said hydraulic motors through a hydraulic control unit consisting of a distributor designed to place in communication fluid delivered under pressure with said at least one motor or several motors during rotation of the drum with which it is engaged.

Figure 4:
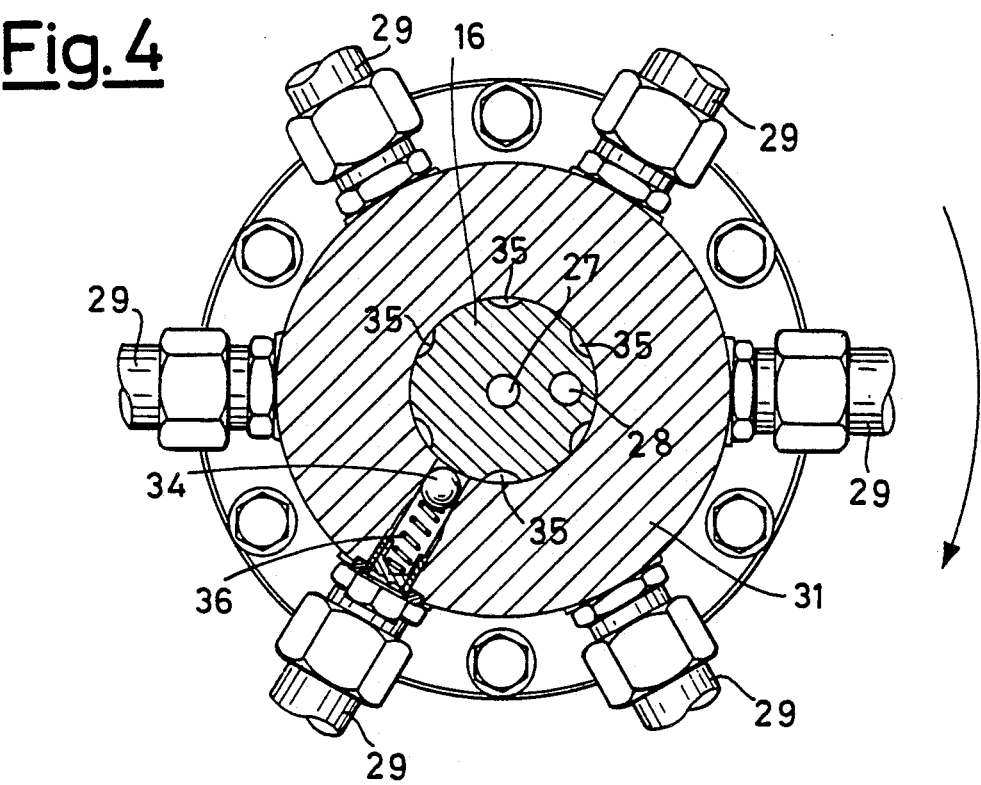
Figure 5:
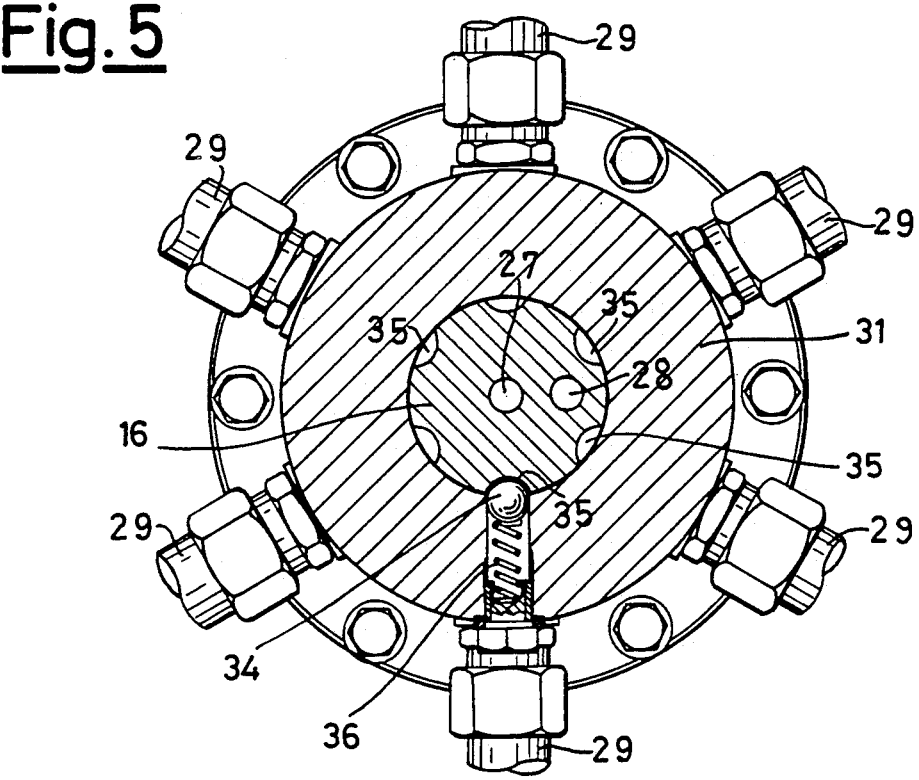

The structural and functional characteristics of the invention and its advantages will be made more clearly understandable by the following description with reference to the annexed drawings which show an example of a practical embodiment of the invention. In the drawings FIG. 1 is a partially sectional front elevation view illustrating a bar loading device activated in accordance with the principles of the invention, FIG. 2 is a cross section along plane II—II of FIG. 1, FIG. 3 is a cross section along plane III—III of FIG. 1, FIG. 4 is a cross section along plane IV—IV of FIG. 2 illustrating the device in the operating phase of rotation and simultaneous feeding of the metal bar, FIG. 5 is a cross section as in FIG. 4 illustrating the device with the machine tool in the stationary stage of operation, FIG. 6 is a cross section along plane VI—VI of FIG. 2 illustrating the device at the beginning of the rotating phase of operation and simultaneous feeding of the metal bar, FIG. 7 is a cross section along plane VII—VII of FIG. 2 illustrating the device in the stationary phase of operation of the machine tool, and FIG. 8 is a cross section along plane VIII—VIII of FIG. 2.

Figure 2:
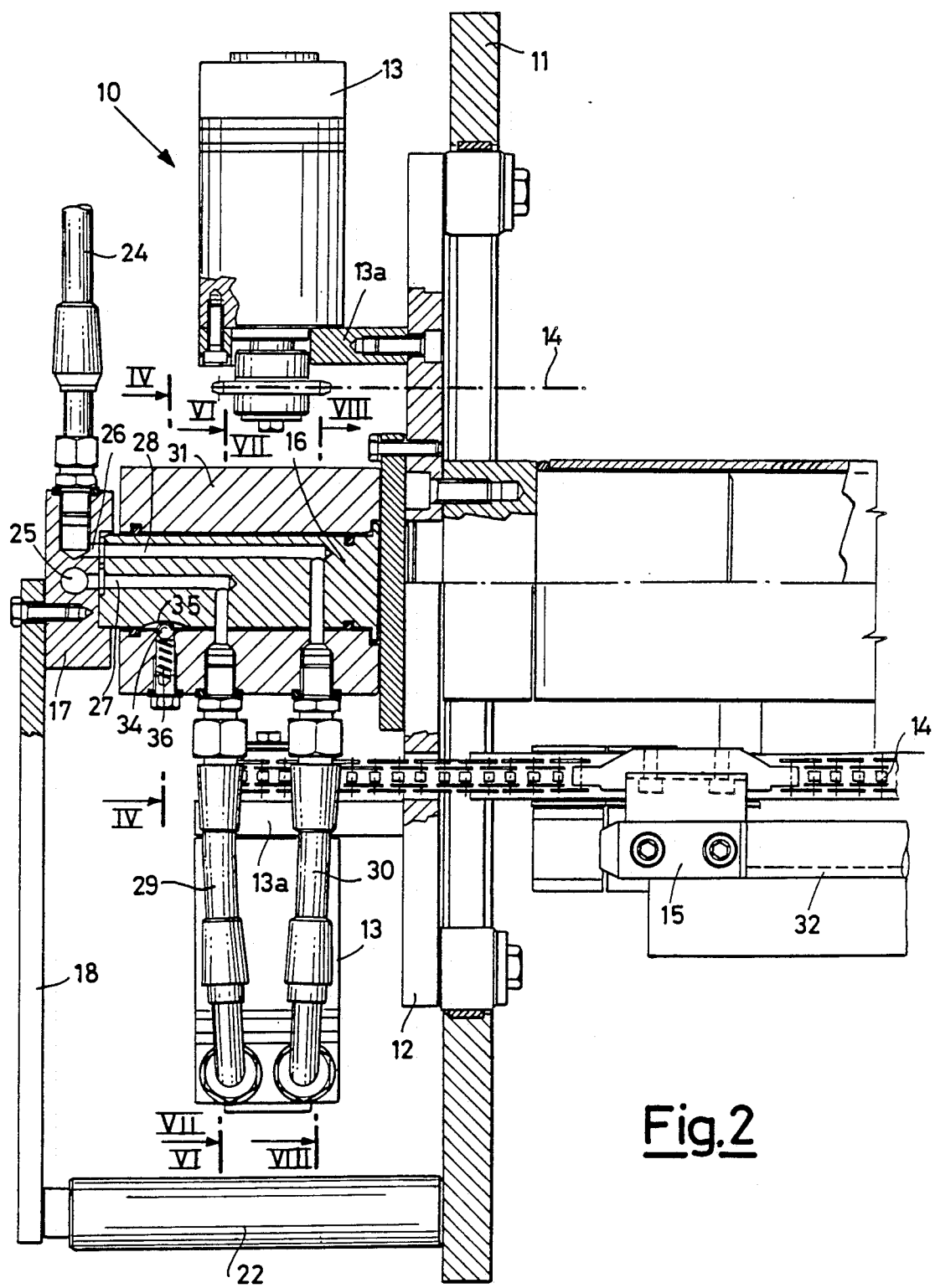
Figure 3:
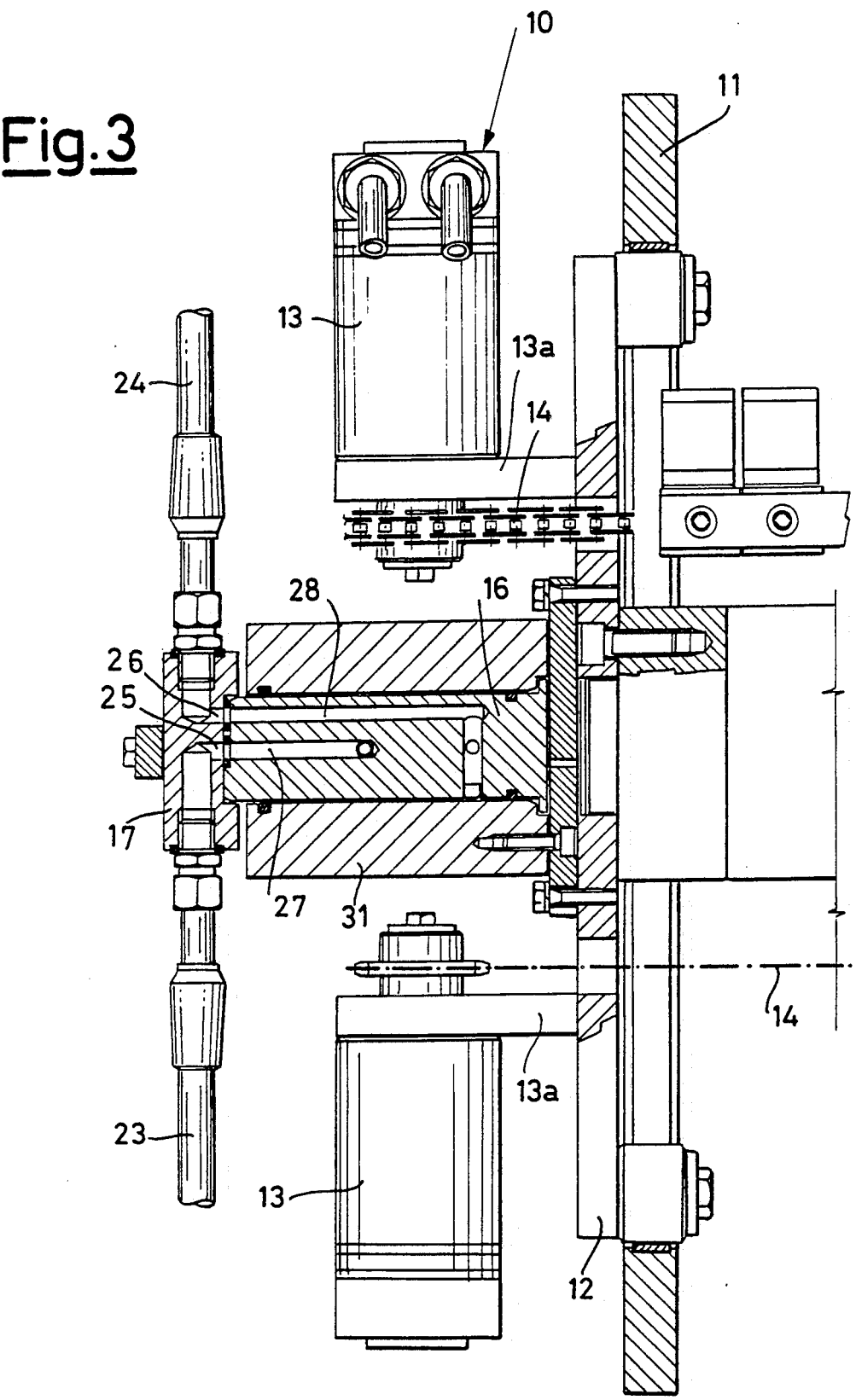

With reference to FIGS. 1-3 of the drawings the bar-loading device which is the object of the invention is indicated as a whole by reference number 10 and is made up structurally of a frame 11 bearing a rotating drum 12.

The rotating drum 12 bears around its periphery a plurality of hydraulic motors 13 fixed by means of plates 13a and equally spaced angularly, each of which, through a chain transmission 14, drives a bar pusher 15.

Said motors 13 are arranged in such a manner as to transmit motion directly to the chain 14, hence with no loss of power.

Fluid under pressure is fed to said hydraulic motors 13 through a hydraulic control unit consisting structurally of a fixed central nucleus 16 borne by a head 17 which is constrained to the frame 11 of the machine through an articulated linkage consisting of an arm 18 fixed at one end to the head 17 and hinged at 19 to a shackle 20. Said shackle 20 is in turn constrained in an adjustable position by means of a slot 21 to a column 22 which is integral with the frame 11.

To the head 17 lead the fluid delivery and discharge ducts 23, 24 which through respective passages 25, 26 in the head 17 are connected to ducts 27, 28 which pass through the fixed central nucleus 16.

As may be seen clearly in the drawings said ducts 27, 28 are designed to be placed in sequence in communication with related ducts 29, 30 respectively which supply fluid under pressure to the motors 13 and discharge said fluid therefrom. Said ducts 29, 30 are made through a rotating sleeve 31 outside the fixed nucleus 16 and integral with the drum 12.

Typically, the fluid under pressure fed to one or more of said hydraulic motors 13, with the resulting advance of the bar pusher 15 which feeds one or more bars 32 to the lathe spindle, can be fed during rotation of the drum 12 hence with no dead time.

This is ensured by a cavity 33 in the fixed nucleus 16 into which leads the delivery duct 27 (FIGS. 6-8).

In this manner feeding of the fluid under pressure to one or more of the hydraulic motors 13 is ensured for the arc of rotation of the drum 12 necessary to bring one or more bars to the next processing station.

As may be seen clearly in FIGS. 4 and 5 of the drawings the different operating positions of the moving sleeve 31 are determined accurately by engagement of a ball 34 in a corresponding notch 35 in the fixed nucleus 16. A spring 36 works with said ball 34 for this purpose.

The phase of the hydraulic control unit described above may be varied by acting on the arm 18 after disengaging the shackle 20 from the column. In this manner it is possible to advance or retard the starting of the hydraulic motor 13 involved in advancing the bar 32.

From the foregoing description it will be clear how the device which is the object of the invention makes it possible to control the feeding of one or more bars 32 even during rotation of the drum 12, thus avoiding dead times in the production cycle of the machine.

It would also be possible to control several motors 13 by creating several distribution cavities 33 with feed steps of value and magnitude independent from each other. For each feed step required there would be a different manner of working together of the related device 18 with the shackle 20 in order to advance or delay said feed step.

The simultaneous operation of several motors could be independent and of different magnitude and value.

Thus is achieved the object mentioned in the introduction to the description.

I claim:

1. Control device for feeding metal bars to a multi-spindle automatic lathe of the type comprising a rotating drum bearing a plurality of bar pushers arranged peripherally and equally spaced from each other, there being associated with said bar pushers control means characterized in that said control means comprises a plurality of hydraulic motors equal in number to said bar pushers, there being a separate hydraulic motor for operating each pusher, each of said motors being fixed to said rotating drum, and means for supplying fluid under pressure selectively to at least one of said hydraulic motors through a hydraulic control unit comprising a distributor designed to place in communication a fluid delivered under pressure with said at least one motor during rotation of the drum to which said motor is constrained.

2. Device in accordance with claim 1 characterized in that said distributor comprises a fixed central nucleus (16) born by a head (17) to which lead first ducts (23, 24) for delivery and discharge respectively of the fluid under pressure, said first ducts being connected, through respective passages (25, 26) made in the head (27), to second ducts (27, 28) respectively made through the fixed central nucleus (16), said second ducts (27, 28) being designed to be placed in sequence in communication with related third ducts (29, 30) respectively for feeding fluid under pressure to the motors (13) and discharge thereof therefrom, said third ducts (29, 30) being made through a rotating sleeve (31) outside the fixed nucleus (16) and integral with the drum (12), there being made in the fixed nucleus (16) at least one cavity (33) designed to communicate with the related delivery duct (27) of said first ducts during the rotation of the drum (12) necessary to bring a bar to the following processing station.

3. Device in accordance with claim 2 characterized in that said head (17) is constrained to the frame (11) of the machine through an articulated linkage comprising of an arm (18) fixed at one end to the head (17) and hinged at (19) to a shackle (20), said shackle (20) being constrained in an adjustable position by means of a slot (21) to a column (22) integral with the frame (11).

4. Device in accordance with claim 2 characterized in that with the rotating sleeve (31) works a ball (34) which a spring (36) forces to engage with a corresponding notch (35) made in the fixed nucleus (16).

* * * * *